(12) United States Patent
Winiecki

(10) Patent No.: US 9,667,302 B2
(45) Date of Patent: May 30, 2017

(54) FAST CALIBRATION

(71) Applicant: Sequans Communications Ltd., Reading (GB)

(72) Inventor: Thomas Winiecki, Paris la Défense (FR)

(73) Assignee: SEQUANS COMMUNICATIONS LTD., Reading (GB)

( * ) Notice: Subject to any disclaimer, the term of this patent is extended or adjusted under 35 U.S.C. 154(b) by 0 days.

(21) Appl. No.: 14/932,155

(22) Filed: Nov. 4, 2015

(65) Prior Publication Data

US 2016/0127004 A1  May 5, 2016

(30) Foreign Application Priority Data

Nov. 4, 2014  (EP) .................................... 14306760

(51) Int. Cl.
| | | |
|---|---|---|
| *H04B 1/40* | (2015.01) | |
| *H04B 17/21* | (2015.01) | |
| *H04B 17/11* | (2015.01) | |
| *H04B 17/14* | (2015.01) | |
| *H04B 17/00* | (2015.01) | |
| *H04B 17/354* | (2015.01) | |

(52) U.S. Cl.
CPC .............. *H04B 1/40* (2013.01); *H04B 17/11* (2015.01); *H04B 17/14* (2015.01); *H04B 17/21* (2015.01); *H04B 17/0085* (2013.01); *H04B 17/354* (2015.01)

(58) Field of Classification Search
CPC ........... H04B 1/40; H04B 17/21; H04B 17/11
USPC ............................................ 455/77; 375/224
See application file for complete search history.

(56) References Cited

U.S. PATENT DOCUMENTS

| | | | | | |
|---|---|---|---|---|---|
| 4,535,307 | A | * | 8/1985 | Tsukii | G01R 1/24 324/601 |
| 5,117,377 | A | * | 5/1992 | Finman | G01S 7/4004 333/103 |
| 5,170,126 | A | * | 12/1992 | Wedge | G01R 29/26 324/613 |
| 5,274,333 | A | * | 12/1993 | Ghannouchi | G01R 27/06 324/601 |
| 5,488,561 | A | * | 1/1996 | Berkowitz | F25J 3/0209 700/45 |

(Continued)

OTHER PUBLICATIONS

European Search Report for European Appl. No. EP 14 30 6760.1, titled: Fast Calibration, Dated: Mar. 30, 2015.

*Primary Examiner* — Hai V Nguyen
(74) *Attorney, Agent, or Firm* — Hamilton, Brook, Smith & Reynolds, P.C.

(57) ABSTRACT

A computer implemented method of calibrating a device comprising the steps of: deriving an analytic expression for a variable to be optimized of the device in terms of at least one parameter of the device, transforming the analytic expression into polynomial form of the at least one parameter of the device, the polynomial form comprising N coefficients, capturing at least N samples of a value of the variable from the device under calibration, each sample being a result of a different independent pre-determined value of the at least one parameter, applying the captured variable values and the corresponding at least one parameter values to the polynomial form, obtaining optimal values of the at least one parameter from the applying step to calibrate the device.

10 Claims, 3 Drawing Sheets

(56) References Cited

U.S. PATENT DOCUMENTS

| | | | | |
|---|---|---|---|---|
| 5,748,506 A * | 5/1998 | Bockelman | G01R 35/00 | 324/601 |
| 6,643,597 B1 * | 11/2003 | Dunsmore | G01R 35/00 | 702/104 |
| 6,823,276 B2 * | 11/2004 | Wong | G01R 35/005 | 702/85 |
| 6,950,734 B2 * | 9/2005 | Zimmermann | F16D 48/06 | 192/3.58 |
| 7,054,780 B2 * | 5/2006 | Dunsmore | G01R 35/005 | 324/750.02 |
| 7,148,702 B2 * | 12/2006 | Wong | G01R 27/28 | 324/601 |
| 7,369,813 B2 * | 5/2008 | Andersson | H03C 3/40 | 375/295 |
| 7,545,151 B2 * | 6/2009 | Martens | G01R 27/28 | 324/601 |
| 7,844,015 B2 * | 11/2010 | Assouline | H04L 27/364 | 375/298 |
| 7,962,108 B1 * | 6/2011 | Khlat | H03F 1/3241 | 455/114.3 |
| 8,009,762 B1 * | 8/2011 | Al-Qaq | H04L 27/361 | 375/296 |
| 8,165,854 B1 * | 4/2012 | Wei | G03F 1/36 | 703/2 |
| 8,224,265 B1 * | 7/2012 | Mahoney | H04B 1/0475 | 375/297 |
| 8,278,620 B2 * | 10/2012 | Schwartz | H01J 49/0045 | 250/252.1 |
| 8,319,504 B2 * | 11/2012 | Roff | G01R 27/30 | 324/629 |
| 8,405,405 B2 * | 3/2013 | Tsironis | G01R 27/32 | 324/638 |
| 8,532,964 B2 * | 9/2013 | Wei | G03F 1/36 | 703/2 |
| 8,611,406 B2 * | 12/2013 | Dai | G01R 31/3171 | 375/224 |
| 8,776,246 B2 * | 7/2014 | Allegri | A61B 5/145 | 370/351 |
| 8,892,380 B2 * | 11/2014 | Simpson | G01R 29/26 | 324/537 |
| 9,124,323 B2 * | 9/2015 | Fron | H04B 15/00 | |
| 9,194,930 B2 * | 11/2015 | Pupalaikis | G01R 35/005 | |
| 2002/0055807 A1 * | 5/2002 | Zimmermann | F16D 48/06 | 701/1 |
| 2006/0074582 A1 * | 4/2006 | Dunsmore | G01R 35/005 | 702/117 |
| 2009/0174415 A1 * | 7/2009 | Verspecht | G01R 35/005 | 324/601 |
| 2009/0182448 A1 * | 7/2009 | Mansfield | G03F 1/36 | 700/110 |
| 2010/0030504 A1 * | 2/2010 | Simpson | G01R 27/02 | 702/69 |
| 2010/0175042 A1 * | 7/2010 | Tirapu Azpiroz | G03F 1/36 | 716/53 |
| 2010/0301875 A1 * | 12/2010 | Roff | G01R 27/30 | 324/629 |
| 2010/0329319 A1 * | 12/2010 | Dai | G01R 31/3171 | 375/224 |
| 2011/0204906 A1 * | 8/2011 | Tsironis | G01R 29/0878 | 324/750.01 |
| 2011/0266426 A1 * | 11/2011 | Schwartz | H01J 49/0045 | 250/252.1 |
| 2012/0099630 A1 * | 4/2012 | Verhelst | H04B 17/16 | 375/224 |
| 2012/0323505 A1 * | 12/2012 | Pupalaikis | G01R 35/005 | 702/58 |
| 2013/0308693 A1 * | 11/2013 | Li | H04W 24/02 | 375/224 |
| 2015/0073749 A1 * | 3/2015 | Simpson | G01R 27/28 | 702/182 |
| 2015/0097578 A1 * | 4/2015 | Simpson | G01R 27/02 | 324/613 |

* cited by examiner

Prior Art

FAST CALIBRATION

This invention relates to the calibration of electronic devices. It is particularly suitable for, but by no means limited to, fast calibration of transceiver devices.

RELATED APPLICATION

This application claims priority under 35 U.S.C. §119 or 365 to European Application No. 14306760.1, filed Nov. 4, 2014. The entire teachings of the above application are incorporated herein by reference.

BACKGROUND

Most analog and RF transceivers ICs suffer from tolerances and part-to-part performance variation that require calibration of each device. Product calibration generally entails adjusting one or more tuning parameters whilst observing a particular performance metric and finding the tuning parameters values that yield device performance within the desired range.

Product calibration is typically performed as part of a wider product test implementation. The general setup for such a product test is shown in FIG. 1.

The device under test (DUT) 10 receives test signals 11 from test equipment 12 or transmits signals 13 to test equipment 12. Both DUT 10 and test equipment 12 are typically controlled 15 (including test setup) by a controller PC 14 or other controlling device such as a dedicated processing system which also collects 16 the measured data provided by the test equipment 12 and/or the DUT 10.

In some cases a device being calibrated (DUT 10) comprises a controlling element. Furthermore, it is possible that the device being calibrated comprises one or more separate sub-systems that can mutually act as tested and testing sub-systems. For example, the receiver part of a transceiver IC may test the transmitter and vice-versa. In such cases auto-calibration may be possible and no explicit controller PC 14 or test equipment 12 may be needed. However, conceptually separate parts of the system may be associated as controlling element (e.g. PC 14), test equipment 12 and tested sub-system. All following discussions therefore include such architectures, however they may not all be present.

As is understood, testing and calibration, especially when reliant on external test equipment, adds to the overall product cost. The shorter the overall test and calibration time, the smaller the associated cost.

Typically, all calibration methods follow some kind of successive approximation scheme where starting from a single measurement or a series of measurements, the range of candidate tuning parameters is gradually reduced until the search converges on a set of tuning parameters that meet performance requirements.

In a successive approximation scheme, the controlling PC 14 first instructs the DUT 10 to execute a test using an initial set of tuning parameters and it also instruct the test equipment 12 to collect results based on this initial parameter set. Once measurements have been carried out, the results are returned to the controlling unit 14. The controlling unit then checks if the pre-determined desired performance has been met or selects a new set of tuning parameters for a second measurement cycle if the desired performance has not been met. The new set of tuning parameters is chosen based on the previously obtained measurement values. They are not known a priori.

Such iterative schemes normally converge after a few steps. An example can be found in U.S. Pat. No. 7,369,813. Here, an algorithm is described using an example of the calibration of carrier leakage of a wireless transmitter. Carrier leakage describes an unwanted spectral component at the centre of the transmit channel associated with direct-conversion transmitters. In nearly all implementations, carrier leakage is observed due to small mismatches in the analog and RF circuits performing the up-conversion from baseband signal onto the carrier wave signal. The calibration is conceptually simple. Two tuning parameters (referred to as x and y in the following), are added into the signal path, one to the in-phase signal component and one to the quadrature component as would be understood. One particular combination of the two parameters leads to cancellation with the component originating from circuit imperfections and hence a desired performance.

U.S. Pat. No. 7,369,813 proposes a way to quickly converge on the optimum set of tuning parameters. However, the method is iterative: the parameters chosen in a measurement depend on the choice of previous parameters and the measured carrier leakage.

The disadvantage of such iterative schemes is that the communication between controlling PC 14, test equipment 12 and DUT 10 can dominate the overall calibration time. While the actual measurement of a spectral component can be very fast (e.g. one millisecond), the overall turn-around time between setting up a test, triggering the measurement, collecting the results and processing it can often be much longer (e.g. 100 milliseconds).

A major contributor to calibration time is typically the time taken to setup 15 both test equipment 12 and DUT 10 and to collect results 16. Minimizing the number of setup and data collection cycles reduces calibration time and reduces overall cost.

There is therefore a need to minimise the setup and data collection times.

SUMMARY

According to a first aspect there is provided a computer implemented method of calibrating a device as defined in claim 1 of the appended claims. Thus there is provided a method comprising the steps of deriving an analytic expression for a variable to be optimised of the device in terms of at least one parameter of the device, transforming the analytic expression into polynomial form of the at least one parameter of the device, the polynomial form comprising N coefficients, capturing at least N samples of a value of the variable from the device under calibration, each sample being a result of a different independent pre-determined value of the at least one parameter, applying the captured variable values and the corresponding at least one parameter values to the polynomial form, obtaining optimal values of the at least one parameter from the applying step to calibrate the device.

Optionally, the method wherein the pre-determined parameter values are derived from a sub-region of the normal operating region of the parameter values of the device to be calibrated.

Optionally, the method wherein the sub-region is based on characteristics and/or a desired performance of the device to be calibrated.

Optionally, the method wherein the number of samples to be captured is more than the number of coefficients in the polynomial expression.

Optionally, the method wherein pre-determined parameter values are chosen so that noise intrinsic to the individual samples is averaged such that the polynomial form provides a curve fit when more than N samples are captured.

Optionally, the method wherein the capturing step is performed in one scan of the parameter values.

Optionally, the method wherein the capturing step comprises:
  instructing the device to operate with the at the least one parameter set at a pre-determined value;
  capturing a sample of a value of the variable from the device as a result of the instructing step; and
  repeating the instructing and capturing steps until N samples have been captured, each sample being a result of a different independent pre-determined value of the at least one parameter;

Optionally, the method wherein the instructing, capturing and repeating steps are performed in one scan of the parameter values.

Optionally, the method wherein the pre-determined values of the at least one parameter provide independent data points.

According to a second aspect there is provided a computer readable medium as defined in claim 10. The computer readable medium comprising instructions that when executed by a processor cause the processor to carry out any of the methods described herein.

According to a third aspect there is provided a processor as defined in claim 11. The processor being arranged to carry out any of the methods described herein.

According to a fourth aspect there is provided a computer program. The computer program comprising instructions that when executed by a processor cause the processor to carry out any of the methods described herein.

According to a fifth aspect there is provided an apparatus. The apparatus comprises at least one processor and at least one memory, wherein the at least one memory stores computer-executable instructions which, when executed by the at least one processor, cause the apparatus to perform any of the methods described herein.

With all the aspects, preferable and optional features are defined in the dependent claims.

BRIEF DESCRIPTION OF THE DRAWINGS

Embodiments will now be described, by way of example only, and with reference to the drawings in which.

In the figures, like elements are indicated by like reference numerals throughout.

Overview

The method of calibration discussed herein exploits the fact that the functional dependency between the measured performance value (e.g. carrier leakage) and the tuning parameters (e.g. x and y) is often known. The example of transmitter (the device to be calibrated) carrier leakage calibration falls into a class of calibration routines where the measured quantity (carrier leakage, $P_{unwanted}$) has a simple square-law relationship with the tuning parameters:

$$P_{unwanted} = \alpha \cdot [(x-x_{opt})^2 + (y-y_{opt})^2] + P_n, \qquad (1)$$

where x and y represent the tuning parameters (I and Q DC offsets as would be understood for transmitter carrier leakage), $x_{opt}$, $y_{opt}$ the optimum settings that minimize $P_{unwanted}$. In the example, $P_{unwanted}$ is the power at the carrier. $P_n$ denotes random measurement noise or a measurement floor caused by unrelated effects (e.g. second-order distortion).

Other examples that follow this particular square-law include transmitter IQ imbalance calibration, receiver IP2 calibration ($2^{nd}$ order calibration) but also many measurements where the unwanted power is measured in terms of Error Vector Magnitude (EVM, generalized noise power over signal power). For example, in envelope tracking systems, it is essential to calibrate both the relative time delay between transmit signal and power amplifier (PA) supply signal as well as the relative gain. As delay (x) and gain (y) are swept, the EVM at the PA output is measured. At the optimum delay and gain settings the EVM is minimized, and around the optimum setting EVM exhibits a parabolic profile in both delay and relative gain parameters in the same way as described in equation (1).

Figure 4:
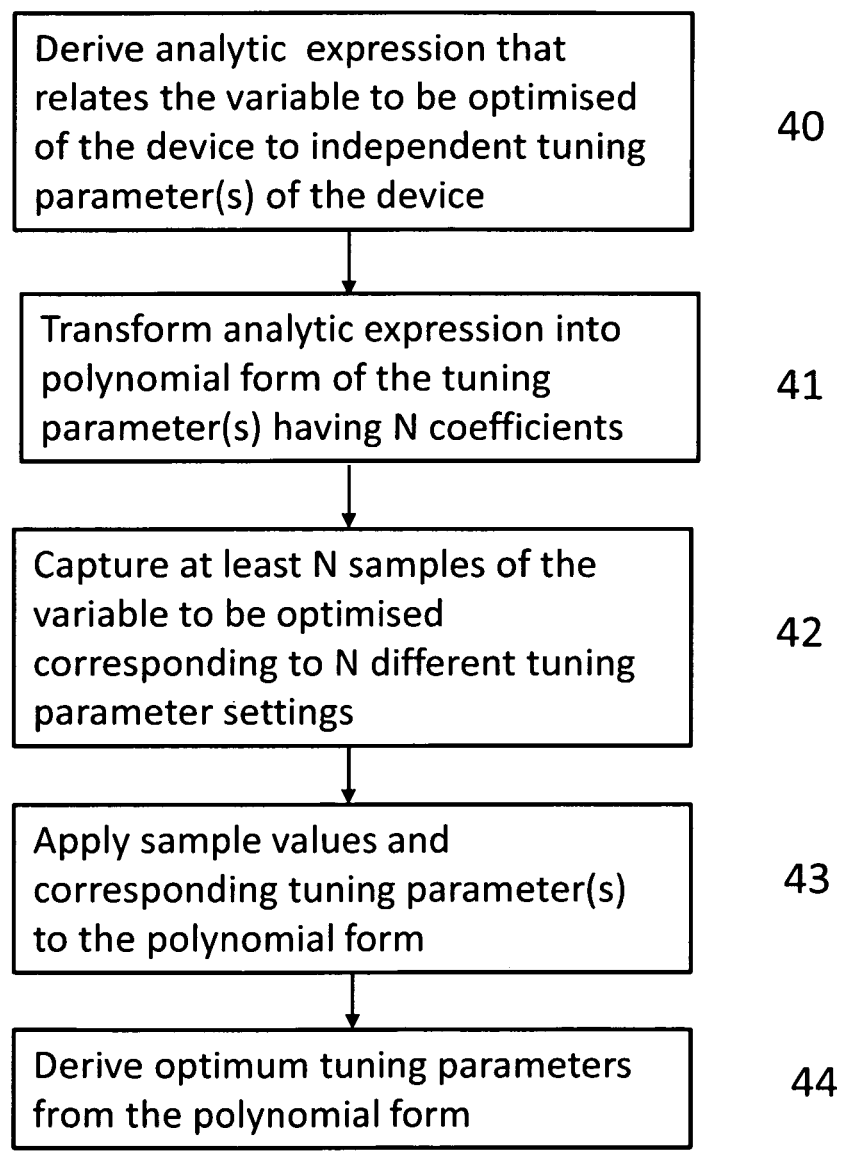
FIG. 4 illustrates a method of calibrating a device according to an embodiment.

In overview, and as illustrated in FIG. 4, the method of calibration comprises capturing a problem to be solved (calibration to be carried out) in an analytic expression which in effect, relates the variable to be optimised (minimised or maximized), e.g. unwanted power, to independent tuning parameter(s) of a device. The method may be implemented on a computer or other processing device. At step 40, an analytic expression is derived that relates the variable to be optimised to tuning parameter(s) of the device. This expression is often known as it describes the intended effect the tuning parameters have on the functionality of the device.

At step 41, the analytic expression is transformed to take a polynomial form of the (independent) tuning parameter(s). This may involve a non-linear mapping of the quantity to be optimized or of a tuning parameter. For example, the unwanted power measured by test equipment may be in returned in units of dbm (a logarithmic scale) to the controlling unit but a polynomial form may only be obtained by converting the power to Watts (a linear scale). The resulting polynomial is expressed as having N number of independent coefficients.

The number of coefficients present in the polynomial is the minimum number of samples, N, of the variable to be measured that are needed to construct the polynomial and deduce the optimum values of the tuning parameters to provide the desired calibration of the device. Each sample $y_i$, i=1 . . . N, of the variable to be calibrated is sampled at different tuning parameter values. As will be explained later, the N mutually different tuning parameter values used are preferably arranged to probe the variable to be optimised in all dimensions. Hence, at step 42, at least N samples of the variable to be optimised are captured from the device under calibration, each sample being produced by different tuning parameter values. The tuning parameter values may be pre-determined. The N number of samples may be captured in one scan of the tuning parameter values i.e. without any iteration and without any dependency of subsequent tuning parameters on previously obtained measurements. The capturing of the samples may comprise instructing the device to operate with the at the least one parameter set at a pre-determined value, capturing a sample of a value of the variable from the device as a result of the operating step, and repeating the instructing and capturing steps until N samples have been captured, each sample being a result of an independent pre-determined value of the at least one parameter.

The N samples are preferably captured using tuning parameter values pre-determined from within a sub-region of the overall operating space of the device to be calibrated (explained further later). Hence, at an optional step, a sub-region of parameter values to be used may be derived based on characteristics and/or a pre-determined desired performance of the device to be calibrated. The set of pre-determined tuning parameters preferably span a region of the parameter space wide enough for the measurements to be sufficiently different from one another to be robust against measurement noise. The parameter set preferably explores all dimensions of the parameter space.

At step 43, subsequent to the capture of the samples of the variable to be measured, the values of the measured variable and the corresponding tuning parameter(s) used are applied to the re-arranged polynomial form from step 41. Optionally, one or more of the polynomial's coefficients may be computed.

At step 44, the optimal values of the tuning parameter(s) are derived from the polynomial form. Iteration is not required.

The optimal values of the tuning parameter(s) derived at step 44 may be used to form the basis of calibrating the device and all similar devices. The calibration process can be completed with only one scan of the tuning parameters which reduces time to calibrate by way of reducing the number and frequency of setup instructions that must be sent to the controller 14, test equipment 12 and DUT 10 during the taking of measurements in order to calibrate the DUT.

The method also can be used if the functional dependence of the undesired component has a different form i.e. does not exhibit a square-law relationship with tuning parameters. The method may be applied to any other polynomial law with any number of tuning parameters (multi-dimensional parameter space). Furthermore, exponential, logarithmic and power-law relationships can often be mapped to polynomial form and can also benefit from the method described herein. For example, where the relationship between tuning parameters and measurement to be optimised is an exponential relationship, the log of the raw measurements obtained from the N samples of tuning parameters may be used as input variables to the polynomial to be solved, in other words the raw measurements may be manipulated and/or transformed before being used as input variables to the polynomial expression.

If more than the minimum of N samples of the variable to be calibrated are sampled, then increased noise rejection is obtained as would be understood resulting in a more accurate derivation of optimal tuning parameter values.

Mathematically speaking, the polynomial form can be obtained from N samples by means of polynomial interpolation. In that case the polynomial will follow the measured data points including any noise exactly. If more than N measurements are used, the polynomial will not necessarily follow all data points but provide the best curve fit to the data samples. The technique of finding the polynomial that best approximates the data points is known as polynomial regression. Polynomial interpolation may be viewed as a special case of polynomial regression. The advantage of polynomial regression is that measurement noise can be suppressed by using all measurements in the estimation procedure. In some cases this may allow use of simpler test setup or lower cost test equipment.

Therefore, if an efficient way is found to locate the two-dimensional (or higher-dimensional) minimum from a single, fixed, set of tuning parameters, all calibration routines can be carried out in the same manner. The disclosed method involves taking measurements (for example of independent pairs, $x_i$, $y_i$) located across the part of the parameter space in which the minimum is expected.

The method is able to find the optimum tuning setting based on a single parameter scan only. No iterations are needed which reduces overheads of both calibration time (the taking of measurements and the setting up to take those measurement) and hence cost.

DETAILED DESCRIPTION

Figure 2:
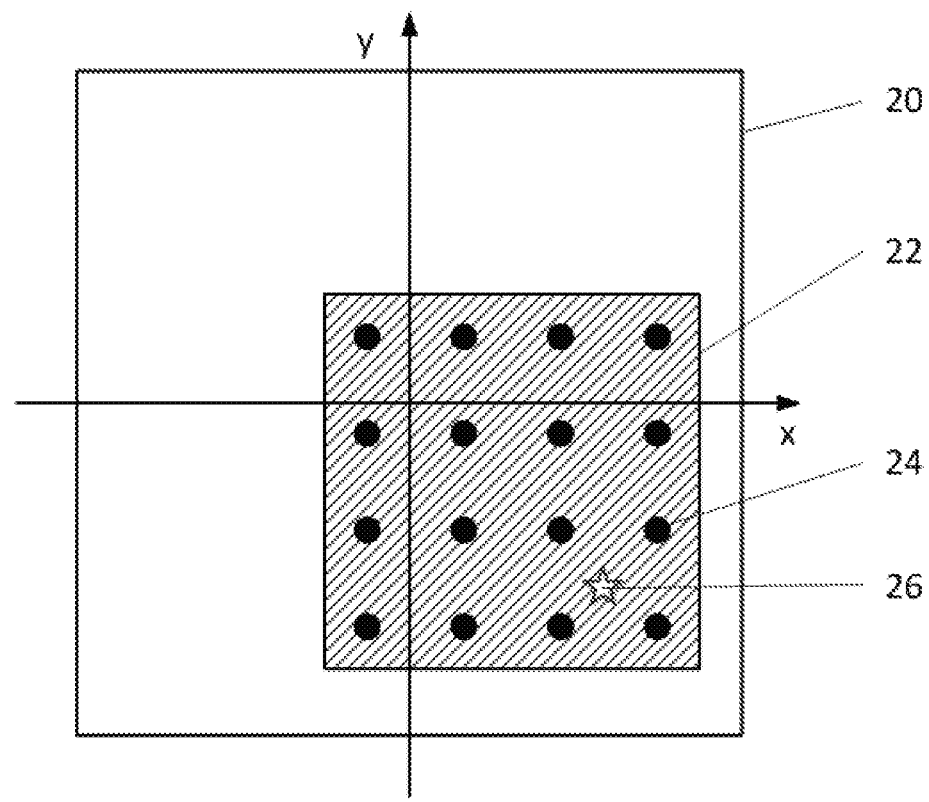
FIG. 2 illustrates a parameter space spanned by x and y parameters and a sub-region where measurements are taken according to an embodiment.

The following discussion in relation to FIG. 2 uses an example of tuning parameter pairs as present in previous equation (1). However, the same approach could be applied to tuning parameters of other dimensions in order to solve polynomial expressions of any other dimensions or in any other number of independent parameters.

Turing to FIG. 2, a parameter space 20 spanned by x and y parameters is illustrated with a sub-region 22 of parameter space area where optimum parameter setting is expected. A grid of four-by-four points where measurements are taken 24 is also shown together with an optimum parameter setting 26 (in this embodiment a parameter pair ($x_{opt}$, $y_{opt}$)). The grid may comprise other numbers of measurement points.

As would be understood, it is unlikely that the entire parameter space 20 must be searched, a sub-region 22 can usually be identified during product characterization that will contain the optimum setting 26 for all devices of the same type under test (calibration). Typically, the total parameter range 20 is much wider than needed. Device designers typically provide margin to account for unexpected effects (mismatches between simulated and actual performance). When the first samples of the device are evaluated, the search range can typically be reduced to a sub-region 22. The sub-region is then the range in which the optimum parameter set 26 is expected based on additional knowledge. For example, evaluation of a large number of devices may have proved that the optimum tuning setting can always be found within a certain sub-region, therefore the parameter space can be reduced to this sub-region.

We assume that the power measurements follow a parabolic profile as follows:

$$P_i = P(x_i, y_i) = \alpha \cdot [(x_i - x_{opt})^2 + (y_i - y_{opt})^2] + P_n + \epsilon_i, \quad (2)$$

where $P_n$ corresponds to the average added noise power present in the measurements and $\epsilon_i$ is a random noise contribution to the i-th measurement with zero mean value: $\langle \epsilon_i \rangle = 0$, $\langle \ldots \rangle$ denoting the arithmetic average.

The optimum parameters $x_{opt}$ and $y_{opt}$ as well as the overall factor $\alpha$ can be found by a method known as polynomial regression. The above equation may be re-written as follows.

$$P_i = P(x_i, y_i) = \alpha \cdot (x_i^2 + y_i^2) - (2\alpha \cdot x_{opt}) \cdot x_i - (2\alpha \cdot y_{opt}) \cdot y_i + (\alpha \cdot x_{opt}^2 + \alpha \cdot y_{opt}^2 + P_n) + \epsilon_i = \tfrac{1}{2} \cdot C_1 \cdot (x_i^2 + y_i^2) + C_2 \cdot x_i + C_3 \cdot y_i + C_4 + \epsilon_i \quad (3)$$

The constants $C_1 \ldots C_4$ may be written as vector C. The factor ½ is chosen to simplify the final expressions as will be seen. Assuming now that N points ($x_i$, $y_i$) have been collected (i=1 ... N). The minimum number of independent data points needed for polynomial regression equals the number of fitting parameters, in this embodiment the minimum number N=4 (to find coefficients $C_1 \ldots C_4$). Whether the selected parameter locations are independent can be seen from the determinant of the square matrix ($Z^T Z$). Generally, the determinant is non-zero and the matrix can be inverted. For special patterns of parameter locations, the determinant of the matrix becomes zero and the coefficients $C_1 \ldots C_4$ cannot be evaluated. For example, all test points lying on a straight line or on a circle are two such special cases where the determinant vanishes. One can understand this as follows: For certain patterns it is not possible to evaluate the shape of the parabolic profile. For example, when all parameter pairs ($x_i$, $y_i$) have the same $y_i$ ($y_1 = y_2 = \ldots = y_N$), then there is no way of working out how the unwanted power depends on parameter y.

Further, the tuning parameters may be arranged in a matrix Z made up of four columns and N rows corresponding to the N measurements. The i-th row is formed as follows $$Z_{i,1 \ldots 4} = (\tfrac{1}{2}(x_i^2 + y_i^2), x_i, y_i, 1). \quad (4)$$

Then all measurements may be expressed in the following vector form $$P = Z \cdot C + \epsilon, \quad (5)$$

where P is the N×1 vector of all measured power values, Z a N×4 matrix capturing the tuning parameter settings, the 4×1 vector C contains the coefficients of the above polynomial and N×1 vector $\epsilon$ the deltas between measured powers and quadratic curve fit. The best curve fit is achieved if scalar $|\epsilon|^2$ is minimized.

$$|\epsilon|^2 = \epsilon^T \epsilon = (P - Z \cdot C)^T \cdot (P - Z \cdot C) = P^T P - C^T Z^T P - P^T Z C + C^T Z^T Z C = P^T P - 2 \cdot C^T Z^T P + C^T (Z^T Z) C \quad (6)$$

The derivative with respect to the fitting parameters C is zero at the point where $|E|^2$ is minimized:

$$\partial/\partial C |\epsilon|^2 = 0 = -2 \cdot Z^T P + (Z^T Z + (Z^T Z)^T) C = -2 \cdot Z^T P + 2 \cdot Z^T Z C \quad (7)$$

Therefore the best polynomial fit is achieved for the following C as would be understood:

$$C = (Z^T Z)^{-1} Z^T \cdot P = M \cdot P. \quad (8)$$

Note that because the pattern of ($x_i$, $y_i$) is constant the 4×N matrix $M = (Z^T Z)^{-1} Z^T$ is independent of the measurement results and can be pre-calculated and stored as a fixed table. The final multiplication with vector P is then straightforward.

Having found vector C, the optimum set of tuning parameters can be computed. Considering equation (3), the unwanted power is minimized when $\partial P/\partial x = \partial P/\partial y = 0$. This is the case for the following pair of x and y parameters:

$$x_{opt} = -C_2/C_1, \text{ and} \quad (9)$$

$$y_{opt} = -C_3/C_1. \quad (10)$$

In this example, constant $C_4$ is not strictly needed for finding the optimum tuning setting. It merely reflects the amount of unwanted power at $x = y = 0$. It is therefore possible to simplify the equations slightly and just multiply the first three rows of the matrix $M = (Z^T Z)^{-1} Z^T$ with the vector P. In other words, the coefficients $C_1$, $C_2$ and $C_3$ are simply given by multiplying three fixed row vectors with the column vector of the measured power figures:

$$C_k = \Sigma_{i=1 \ldots N} (M_{k,i} \cdot P_i). \quad (11)$$

There are 3·N matrix elements that are independent of measurements. These coefficients can be calculated once and applied to each DUT 10 being calibrated. This means that during calibration, the matrix manipulations described above do not actually have to be carried out. It is sufficient to calculate the three sums described in equation (11) based on constant coefficients $M_{k,i}$. This means the controlling PC only has to store 3·N constants and perform simple multiplication and addition for each DUT. No matrix manipulations would be required.

The same approach as for the example of transmitter carrier leakage calibration can be used for any multi-dimensional polynomial by way of polynomial re-arrangement and regression to provide optimal tuning parameter values in order to optimise a desired variable of the device.

Figure 3:
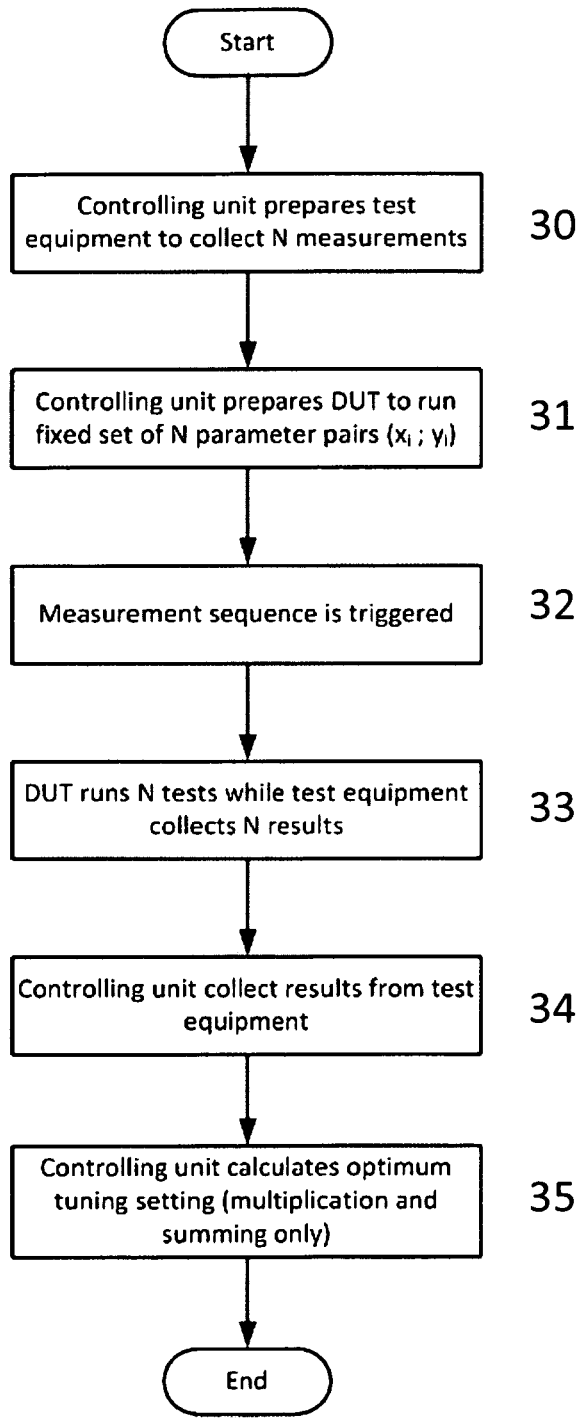
FIG. 3 illustrates communication flow between controlling unit 14, DUT 10 and test equipment 12 when a test sequence is run on the DUT.

FIG. 3 illustrates communication flow between controlling unit 14, DUT 10 and test equipment 12 when a test sequence (for example of FIG. 4) is run on the DUT. The sequence of tuning parameter pairs to be used to collect measurement data is pre-determined before the start of the routine and does not depend on previous measurements. Similarly, the test equipment collects a fixed number of measurements corresponding to the tuning parameter pairs. The communication flow of FIG. 3 may be implemented on a system as shown in FIG. 1.

At step 30, controlling unit 14 initialises, or prepares the test equipment 12 for the collection of N measurements from DUT 10. The controlling unit also initialises, or prepares DUT 10 to run with each of a set of N tuning parameter values (step 31). At step 32, the controlling unit triggers the test equipment and DUT, and the DUT runs N tests with the pre-determined tuning parameter values (step 33), and the test equipment collects the N measurement results (step 34). Steps 32-34 are akin to step 42 of FIG. 4.

The final calculations (step 35) are performed within the controlling unit. They are based on multiplication and summation only, no matrix manipulations are required at this stage—this allows a reduced processor burden to deduce the optimum tuning parameter values. Step 35 is akin to steps 43 and 44 of FIG. 4.

Figure 1:
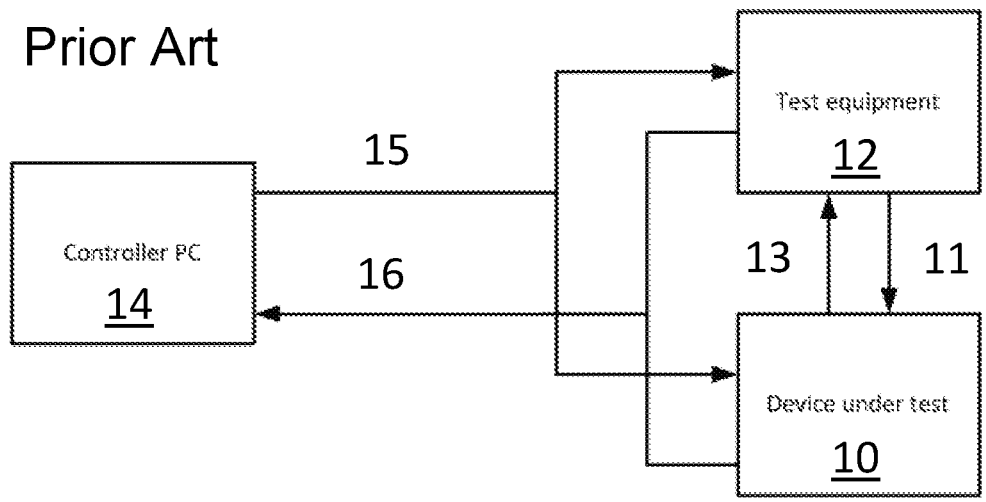
FIG. 1 illustrates a general setup for product calibration according to known systems.

The controller 14, test equipment 12 and DUT 10 may communicate with one another in any manner shown in FIG. 1, for example, controller 14 may receive measurements directly from DUT 10 or test equipment 12, and may initialise, or prepare DUT 10 directly.

The N parameter pairs discussed in relation to FIG. 3 could be parameter triplets or any other number based on the polynomial expression to be solved as explained herein, and also applies to the discussion of parameters in relation to FIG. 4. Therefore FIG. 3 may apply to any calibration exercise where the described method is carried out. The fixed number of measurements, N, may be the minimum required to solve the re-arranged polynomial expression as discussed herein, or could be a higher number based on desired noise rejection, or additional time for allowed for testing.

The method described removes any need for time-consuming iteration. In experiments, the disclosed method allowed certain tests (calibrations) to be speeded up by a factor of one hundred because it eliminates frequent communication between controlling unit 14, DUT 10 and test equipment 12. The number of measurements taken need not be larger than with any iterative scheme. In fact, if the measurement noise is low, the number of measurement points can be as low as the number of fitting parameters. In the described embodiment, that number is four ($C_1$, $C_2$, $C_3$, $C_4$). The polynomial regression then becomes an interpolation between the data points.

Apart from the time advantage as discussed above, there is a second advantage provided by the method. The polynomial regression effectively averages out measurement noise that is present in the individual measurement points. While the accuracy of a successive iteration scheme is limited by the noise in the single most recent set of measurements obtained, here, all measurements are considered equally. In some cases this may allow use of lower cost test equipment because each measurement may exhibit noise that need not be filtered out. Pre-determined parameter values used to obtain the samples may be chosen so that noise intrinsic to the individual sample measurements is averaged such that the polynomial form provides a curve fit when more than N samples are captured.

It is difficult to derive an exact relationship between the noise in an individual measurement (quantified by the variance of the noise power, $Var(\epsilon)=\sigma^2$) and the error of the final estimation for the optimum tuning parameter (quantified by $Var(x_{opt})$ and $Var(y_{opt})$). For the described embodiment, the tuning parameters are preferably arranged so that the curvature of the quadratic profile leads to changes in measured power much larger than the measurement noise. In that case the tolerance of the estimation for $x_{opt}$ and $y_{out}$ are dominated by $Var(C_2)$ and $Var(C_3)$ rather than $Var(C_1)$. In other words, the estimation of the curvature of the parabolic profile which is captured by the coefficient $C_1$ will be more robust against measurement noise if the spacing between the parameters used is large enough to see the effect of the quadratic term.

In general, the estimation improves with the number of measurement points according to $Var(x_{opt})=Var(y_{opt})\sim\sigma^2/N$. A four-fold increase in measurement points will half the error of the estimation for the optimum tuning setting. Whether this relation holds for the particular calibration task at hand can be established through a series of trial runs.

Benefits of the method have been shown, including a reduced time being needed for product calibration time and therefore reduced calibration cost.

A secondary advantage is that all measurements collected during the calibration are directly included in the calculation of the optimum tuning setting which maximally suppresses the effect of measurement noise.

The method is useful for what is generally called production test or production test and calibration. For example, after fabrication of a device, nearly every device goes through a process of testing. Sometimes there are several stages of testing. First, an initial screening is performed at silicon wafer level, then after the device is packaged, and finally, when the device is integrated with the rest of the system.

Further 'auto calibration' may take place when the product is already in the field, later in the lifetime.

The method could be implemented at any of those stages.

In a fabrication plant, production tests rely on expensive equipment and the time each device is being probed by the test equipment adds a significant cost to the overall product cost. In a production environment where thousands of units are tested per hour, parallel production and/or test lines are often used to achieve the required factory throughput. If the time of test and calibration is reduced as with the disclosed method, the number of parallel lines can be reduced, which has a direct impact on cost.

If the calibration is performed when the product is already being used because performance has drifted, for example, due to temperature or simply aging, this method allows the time to recalibrate to be kept as short as possible which provides a more efficient recalibration.

The various methods described above may be implemented by a computer program product. This also applies to any or all individual method steps. The computer program product may include computer code arranged to instruct a computer to perform the functions of one or more of the various methods described above. The computer program and/or the code for performing such methods may be provided to an apparatus, such as a computer or processor, on a computer readable medium or computer program product. The computer readable medium may be transitory or non-transitory. The computer readable medium could be, for example, an electronic, magnetic, optical, electromagnetic, infrared, or semiconductor system, or a propagation medium for data transmission, for example for downloading the code over the Internet. Alternatively, the computer readable medium could take the form of a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD, any physical medium with patterns of holes, a RAM, a PROM, and EPROM, a FLASH-EPROM, NVRAM, any other memory chip or cartridge.

An apparatus such as a computer or processor may be configured in accordance with such code to perform one or more processes in accordance with the various methods discussed herein. Such an apparatus may take the form of a data processing system. Such a data processing system may be a distributed system. For example, such a data processing system may be distributed across a network. Any method as disclosed herein may be implemented on a system as shown in FIG. 1.

What is claimed is:

1. A computer implemented method of calibrating a device comprising the steps of:
   deriving an analytic expression for a variable to be optimised of the device in terms of at least one parameter of the device;
   transforming the analytic expression into polynomial form of the at least one parameter of the device, the polynomial form comprising N coefficients;
   capturing at least N samples of a value of the variable from the device under calibration, each sample being a result of a different independent pre-determined value of the at least one parameter;
   applying the captured variable values and the corresponding at least one parameter values to the polynomial form;
   obtaining optimal values of the at least one parameter from the applying step to calibrate the device;
   wherein the capturing step is performed in one scan of the parameter values.

2. The method of claim 1 wherein the pre-determined parameter values are derived from a sub-region of the normal operating region of the parameter values of the device to be calibrated.

3. The method of claim 2 wherein the sub-region is based on characteristics and/or a desired performance of the device to be calibrated.

4. The method of claim 1 wherein the number of samples to be captured is more than the number of coefficients in the polynomial expression.

5. The method of claim 1 wherein pre-determined parameter values are chosen so that noise intrinsic to the individual samples is averaged such that the polynomial form provides a curve fit when more than N samples are captured.

6. The method of claim 1 wherein the capturing step comprises:
   instructing the device to operate with the at the least one parameter set at a pre-determined value;
   capturing a sample of a value of the variable from the device as a result of the instructing step; and
   repeating the instructing and capturing steps until N samples have been captured, each sample being a result of a different independent pre-determined value of the at least one parameter.

7. The method of claim 1 wherein the instructing, capturing and repeating steps are performed in one scan of the parameter values.

8. The method of claim 1 wherein the pre-determined values of the at least one parameter provide independent data points.

9. A non-transitory computer readable medium comprising instructions that when executed by a processor cause the processor to carry out the method of claim 1.

10. A processor arranged to carry out the method of claim 1.

\* \* \* \* \*